United States Patent
Kamphuis et al.

(10) Patent No.: US 7,001,121 B2
(45) Date of Patent: Feb. 21, 2006

(54) METHOD OF TRIMMING BORE LINERS

(75) Inventors: Dwain L. Kamphuis, West Olive, MI (US); Thomas W. Knowles, II, Holland, MI (US)

(73) Assignee: K-Line Industries, Inc., Holland, MI (US)

( * ) Notice: Subject to any disclaimer, the term of this patent is extended or adjusted under 35 U.S.C. 154(b) by 0 days.

(21) Appl. No.: 10/799,789

(22) Filed: Mar. 12, 2004

(65) Prior Publication Data

US 2004/0191011 A1 Sep. 30, 2004

Related U.S. Application Data

(62) Division of application No. 10/113,058, filed on Apr. 1, 2002, now Pat. No. 6,729,811.

(51) Int. Cl.
*B23B 35/00* (2006.01)
(52) U.S. Cl. .................. 409/132; 408/1 R; 408/67; 408/97; 408/709
(58) Field of Classification Search .............. 408/1 R, 408/67, 72 B, 97, 115 R, 115 B, 202, 241 B, 408/709, 110, 241 S, 79, 80, 81, 712; 29/402.01, 29/402.09, 402.16, 402.18, 402.19, 888.061; 409/132
See application file for complete search history.

(56) References Cited

U.S. PATENT DOCUMENTS

| | | | | |
|---|---|---|---|---|
| 1,295,052 A | * | 2/1919 | Nelson | 408/111 |
| 1,833,898 A | * | 12/1931 | Hansen | 408/56 |
| 2,388,779 A | * | 11/1945 | Boehmler | 470/18 |
| 2,945,403 A | | 7/1960 | Egger | |
| 3,350,964 A | | 11/1967 | Brooks | |
| 3,818,786 A | | 6/1974 | Leshem | |
| 3,828,415 A | | 8/1974 | Kammeraad et al. | |
| 3,977,805 A | * | 8/1976 | Wanous | 408/115 B |
| 4,414,869 A | | 11/1983 | Augustine | |
| 5,249,555 A | | 10/1993 | Kammeraad et al. | |
| 5,281,057 A | | 1/1994 | Ritt | |
| 5,580,195 A | * | 12/1996 | Kelly | 408/115 R |
| 5,919,010 A | * | 7/1999 | Fonseca | 408/67 |
| 5,988,954 A | * | 11/1999 | Gaskin et al. | 408/67 |
| 6,209,509 B1 | | 4/2001 | Kammeraad et al. | |
| 6,367,360 B1 | | 4/2002 | Dunlap et al. | |
| 6,413,022 B1 | * | 7/2002 | Sarh | 408/76 |
| 6,729,811 B1 | * | 5/2004 | Kamphuis et al. | 408/97 |

FOREIGN PATENT DOCUMENTS

JP 6-91439 * 4/1994

* cited by examiner

*Primary Examiner*—Daniel W. Howell
(74) *Attorney, Agent, or Firm*—Price, Heneveld, Cooper, DeWitt & Litton LLP (57) ABSTRACT

A trimmer is provided for trimming a newly-installed sleeve liner after the liner is positioned in a cylinder bore of a combustion engine component. The trimmer includes a trimming cutter adapted to shave off a protruding end of the newly-installed sleeve liner, and a tool holder shaped to stably engage the combustion engine component. The tool holder operably supports the trimming tool for rotation collinearly with a centerline of the cylinder bore and for limited longitudinal movement when the tool holder is attached to the combustion engine component. A tie-down device engages the tool holder and secures the trimmer to the engine component. A venturi suction arrangement is connectable to shop compressed air to remove and includes a suction input adjacent the cutter for collecting all chips and debris from the trimming operation.

20 Claims, 9 Drawing Sheets

METHOD OF TRIMMING BORE LINERS

CROSS-REFERENCE TO RELATED APPLICATION

This is a divisional application under 35 USC §120/§121 of patent application Ser. No. 10/113,058, entitled CUTTER TOOL FOR BORE LINERS, filed on Apr. 1, 2002, now U.S. Pat. No. 6,729,811.

BACKGROUND

The present invention relates to cutter tools for trimming liners that are inserted into a cylinder bore.

It is desirable to provide sleeve-type inserts (sometimes called "liners") made of optimal materials and shaped for friction-fit into cylinder bores of cylinder blocks of internal combustion engines. By using inserts, the cylinder blocks can be made of optimal materials (e.g. low-cost materials that are easily machinable and have high heat transfer properties), and yet the cylinder bores can also be made of optimal materials that will last a long time (e.g. higher cost materials having longer wear and better bearing properties). It is further desirable to minimize the cost of installation of such sleeve-type inserts. For example, most sleeve-type inserts that are friction- or interference-fit into position have a protruding end that must be trimmed after installation. It is desirable to provide an installation and trimming operation that can be done without the need for an expensive milling machine for trimming. This applies to original equipment manufacturers, such as large automotive companies, and also applies to job shops and smaller companies, such as re-manufacturers and engine rebuilders. A problem is that it is difficult to control quality when trying to accomplish machining and trimming operations via manually-operated methods. Fixtures can help, but they are often expensive to build and maintain. Further, they are often cumbersome to use and it is often non-intuitive or unclear how to set up and use them. Notably, even though a manually-operated arrangement is desired, it is also necessary that the arrangement be efficient and quick and that the trimming device be flexible and reliable. For example, the tool must be able to reliably and accurately trim a protruding end of a newly-installed bore insert without leading to damage to the end of the insert and without damage to the engine from loose shavings and debris from the trimming operation.

Another problem with trimming inserts is that the trimmed chips can fall into the cylinder bore. If not removed, they can score and damage the cylinder wall surface, causing considerable damage and thus requiring a second major engine overhaul. Small chips can be especially problematic, since they wedge between the piston and the cylinder wall, where they are engaged and are scraped back and forth with the piston rings. However, removal of all chips is tedious and difficult, especially when the engine block is still in the vehicle where lighting is poor and access is difficult.

Yet another problem with trimmed inserts is their top surface, which must be trimmed flush with a top surface of the cylinder block, so that the head gasket can seal properly between the cylinder block and the cylinder head to prevent oil and radiator fluid cross-contamination and leakage to the cylinder bores. It has been found that the cutters on milling machines, which cutters are rotated as they move linearly across a cutting area, leave a non-cylindrical crisscross pattern on the top surface of the trimmed inserts. This crisscross pattern includes small grooves that lead from the inner surface of the insert (i.e. the cylinder bore) to the outer surface of the insert (i.e. to the top surface of the cylinder block). These small grooves form passages that allow pressurized exhaust gases to sneak under the gasket and over the top of the insert to a remote location adjacent the gasket. Over time, the exhaust gases can enlarge the small grooves, causing premature failure of the gasket, premature loss of compression and engine failure, and other problems. It is desirable to provide an insert trimming apparatus that does not leave a crisscross pattern of grooves on the trimmed end of a cylinder bore insert, to improve the ability to seal a trimmed end of the insert.

Accordingly, a trimming apparatus is desired solving the aforementioned problems and having the aforementioned advantages.

SUMMARY OF THE PRESENT INVENTION

In one aspect of the present invention, a method is provided for trimming a newly-installed sleeve liner after the liner is positioned in a cylinder bore of a combustion engine component. The method includes steps of providing a trimmer including a trimming tool adapted to trim a protruding end of the newly-installed sleeve liner and including a tool holder operably supporting the trimming tool. The tool holder has a first section shaped and adapted to stably engage the combustion engine component and to receive the protruding end of the sleeve liner, and also has a second section operably supporting the trimming tool for rotation and for axial movement toward a selected cylinder bore when the tool holder is attached to the combustion engine component. The method further includes steps of setting a stop mechanism to limit the trimming tool to cutting only down to a flush condition on the engine component; securing the tool holder to a face of the engine component; and operating the trimming tool to shave off the protruding end.

In another aspect of the present invention, a method includes providing a trimming tool adapted to shave off a protruding end of the newly-installed sleeve liner; and providing a tool holder with a first section shaped and adapted to stably engage the combustion engine component, and a second section operably engaging the trimming tool and configured to hold the trimming tool for rotation over a selected cylinder bore when the tool holder is attached to the combustion engine component. The second section of the tool holder has a bore neck, and the trimming tool includes a shaft that is rotatable and also is movable axially in the bore neck. The trimming tool includes a stop incorporating a thrust bearing that engages a top of the neck to limit longitudinal movement of the trimming tool. The method includes securing the tool holder to the engine component; and operating the trimming tool to cut off the protruding end of the sleeve liner until the thrust bearing and the stop are engaged and stop further cutting.

In yet another aspect of the present invention, a method of trimming a newly-installed sleeve liner after the liner is positioned in a cylinder bore of a combustion engine component, comprises steps of providing a trimming tool adapted to shave off a protruding end of the newly-installed sleeve liner, the trimming tool having a drive shaft and having an enlarged cutter head connected to the drive shaft and further having a stop. The method further includes providing a tool holder having a bore neck operably supporting the drive shaft of the trimming tool for rotation and for limited longitudinal movement, with the longitudinal movement being limited by engagement of the stop against the tool holder in at least one direction. The tool holder further has an enlarged pocket for receiving the cutter head and for positioning the cutter head adjacent a protruding end of the newly-installed sleeve liner when the tool holder is supported on the combustion engine component. The tool holder is configured and sized for manual manipulation and operation and having an end shaped and adapted to stably engage the combustion engine component while the trimming tool is being operated manually. The tool holder and trimming tool include a thrust bearing and a stop surface thereof, with the stop surface engaging the thrust bearing to limit longitudinal movement of the trimming tool relative to the tool holder. The method further includes operating the trimming tool until the stop limits further longitudinal movement of the trimming tool.

In yet another aspect of the present invention, a method of repairing a combustion engine component with a damaged cylinder bore, where a friction-fit sleeve liner of bearing material is positioned in the damaged cylinder bore to repair the cylinder bore, comprises steps of providing an apparatus including a trimming tool having a cutter adapted to shave off a protruding end of the newly-installed sleeve liner, the cutter being rotatable about a centerline that is adapted to be positioned collinearly with a centerline of the cylinder bore; the apparatus also including a tool holder for stably engaging the engine component and for operably supporting the trimming tool. The method further includes attaching the trimming tool to the combustion engine component, including holding the trimming tool for rotation over the selected cylinder bore with the centerline of the cutter aligned with the centerline of the cylinder bore; and rotating and extending the trimming tool to trim a protruding end of the liner.

These and other aspects, objects, and features of the present invention will be understood and appreciated by those skilled in the art upon studying the following specification, claims, and appended drawings.

DETAILED DESCRIPTION OF PREFERRED EMBODIMENTS

A trimming apparatus 10 (FIG. 1) is provided for trimming a newly-installed sleeve liner 11 after the liner 11 is positioned in a cylinder bore 12 of a combustion engine component, such as a cylinder block 13. The trimming apparatus 10 includes a trimming tool 14 with cutter inserts 15 adapted to shave off a protruding end 16 of the newly-installed sleeve liner 11, and a tool holder 17 with an end 18 shaped and adapted to stably engage the combustion engine component 13. The tool holder 17 includes a bore neck 19 that operably supports a shaft 20 of the trimming tool 14. The bore neck 19 is configured to engage and support the shaft 20 to operably hold the trimming tool 14 for rotation and limited longitudinal movement over the cylinder bore 12 when the tool holder 17 is attached to the combustion engine component 13 over the selected cylinder bore 12. A tie-down device 21 engages the tool holder 17 and is adapted for attachment to the engine component 13, such as by apertured flanges 22 that receive and locate bolts 23 for threaded insertion into threaded holes 24 in the engine component 13. The illustrated tie-down device 21 comprises a flat plate body shaped to engage the enlarged lower portion of the tool holder 17 in a manner that secures the tool holder 17 to the engine component 13. It is contemplated that the device 21 can be incorporated into the tool holder 17 if desired. For example the flat plate body could be secured to the holder 17 directly or integrally formed with the holder 17, if desired.

Figure 1:
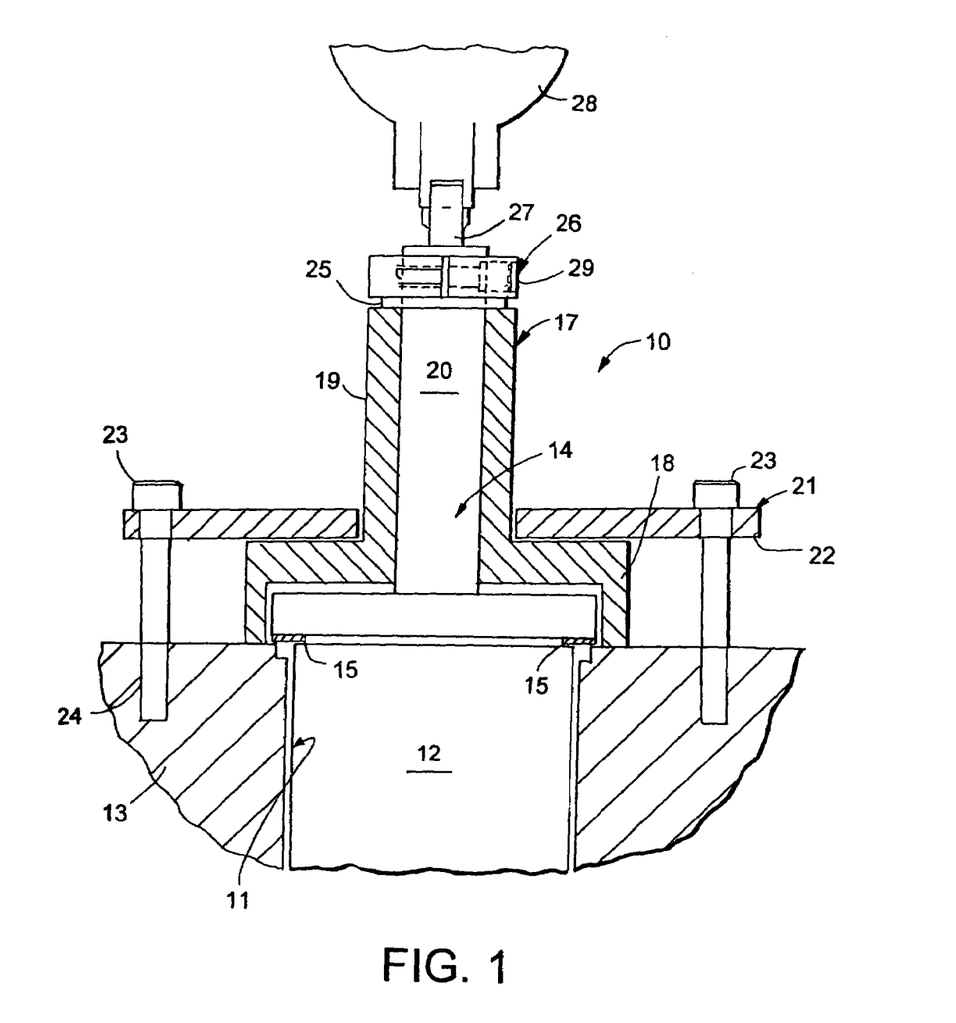
FIG. 1 is a side view of a trimming apparatus embodying the present invention as it is being used to trim a sleeve-type insert in a cylinder bore of a cylinder block.
Figure 2:
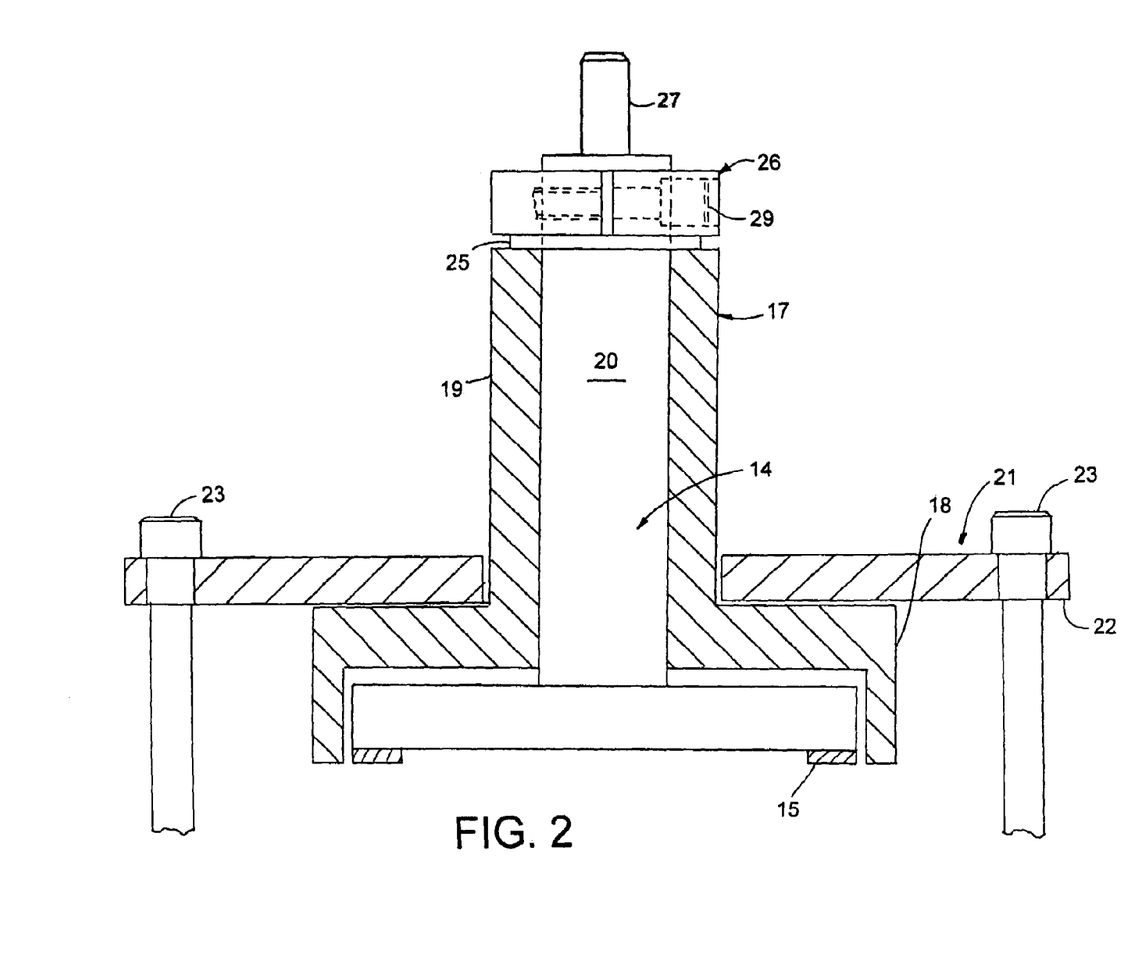
FIG. 2 is a side view of the trimming apparatus in FIG. 1.

A thrust bearing 25 is attached to a top of the bore neck 19. An adjustable ring-type stop 26 is attached to the drive shaft 20. An adapter shank 27 is attached to a top of the drive shaft 20, and is configured for releasable engagement by a motorized hand drill 28 (or drill press or the like). By loosening transverse bolt 29, the stop 26 can be adjusted longitudinally on the drive shaft 20, such that it adjustably limits the longitudinal motion of the trimming tool 14 relative to the tool holder 17. Thus, a depth of the trimming operation is easily and adjustably controlled. Since the flat plate body positions the bolts 23 over existing threaded holes on the engine component, no additional or separate holes or clamping devices are needed for attachment of the apparatus 10 to the engine component that is being worked on.

Advantageously, the present design of a cutter apparatus 10 allows the cutting tool 14 to be attached and mounted to the head side of the engine block in a manner intended to trim a newly-installed bore liner that needs the face cut flush or very close to flush with the deck of the engine block. This design features a shaft collar used as a stop to insure that the operator does not undercut the bore liner below the deck surface (i.e. top surface). A clamping mechanism advantageously uses the cylinder head bolt thread locations to secure the tool to the cylinder block. Carbide inserts are used on the cutting tool for the actual trim cut work, although it is noted that steel or other cutters can be used instead. A drive shank is used with a hand drill or any other rotary machine such as a drill press. Other variations may include thread-type adjustable stops, locating and stabilizing shafting that compresses against the cylinder wall for proper alignment, and/or ball end drive shanks for misalignment take-up. The drive shanks can be hex-shaped, if desired.

In operation, the tool holder is attached to the cylinder block, with the trimming tool positioned over the cylinder bore with a protruding end of an insert. The stop is then set to a desired depth. The trimming tool is then rotated by a manual drill, such as a manually-held hand drill or a drill press, until the stop engages the top of the holder. At such time, the protruding end is trimmed to a level such that it no longer protrudes (i.e. it's not "too long") and also such that the end is not undercut down into a top surface of the cylinder head (i.e. it's not "too short").

Figure 3:
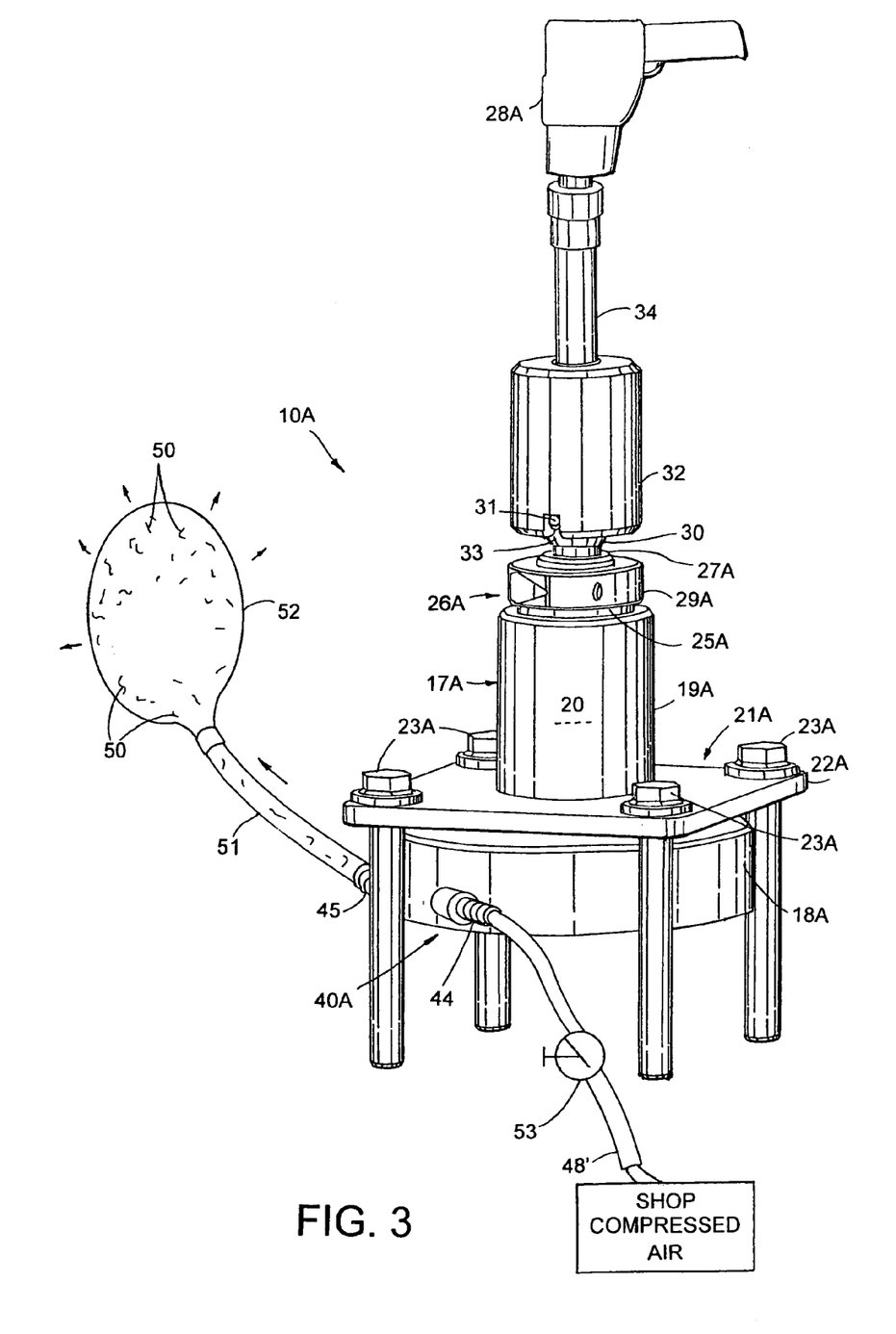
FIG. 3 is a perspective view of a modified trimming apparatus.

A modified trimming apparatus 10A (FIG. 3) includes components and features identical to and similar to the apparatus 10. To reduce redundant discussion, similar and identical components and features are identified with the same identification number, but with the addition of the letter "A".

Figure 4:
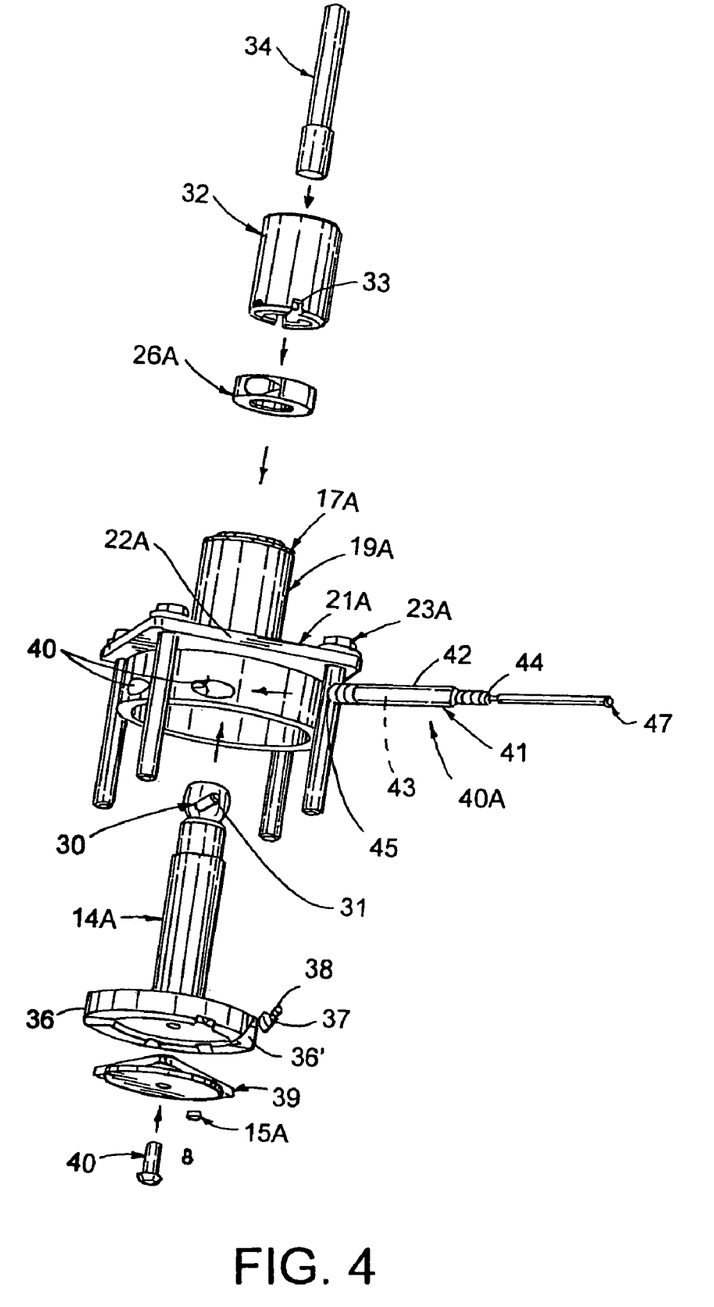
FIG. 4 is an exploded view of FIG. 3.

The trimming apparatus 10A (FIG. 4) includes a universal coupler in the form of a ball 30 on an upper end of the trimming tool 14A. The ball 30 has a radial leg 31. A socket coupler 32 engages the ball 30, and includes a slot 33 that slidably receives the leg 31. A shank 34 extends from socket 32 and is adapted for connection to the drill 28A. The socket 32 is angularly adjustable on ball 30 and allows for angular misalignment between the centerline of the trimming tool 14A and the centerline of rotation of the drill 28A. The slot 33 allows movement of the leg 31, which occurs if the drill 28A is not aligned with the trimming tool 14A. This compensates for misalignment of the drill 28A while still allowing the drill 28A to provide a rotational force to the trimming tool 14A.

The trimming tool 14A includes a disk-shaped cutter head 36 (FIG. 4) with locations 36' configured to receive and support cutters 37, and screws 38 for retaining the cutters 37 to the head 36. A cutter pilot 39 is attached to the head 36 for extending into a leading end of the cylinder bore liner, and a retainer bolt 40 is provided for holding the pilot 39 on the head 36.

Figure 5:
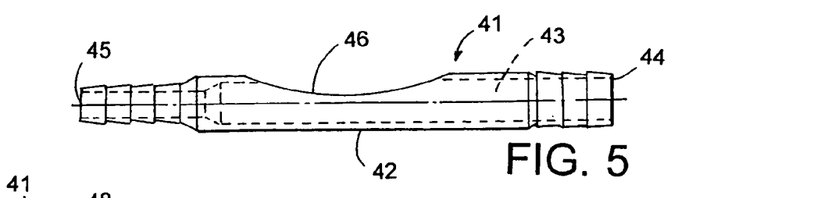
FIG. 5 is a side view of a vacuum barb fitting.
Figure 6:
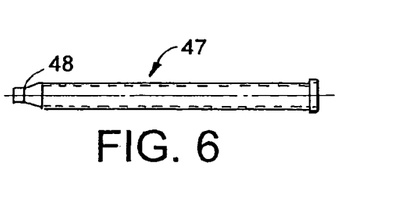
FIG. 6 is a vacuum orifice fitting.
Figure 7:
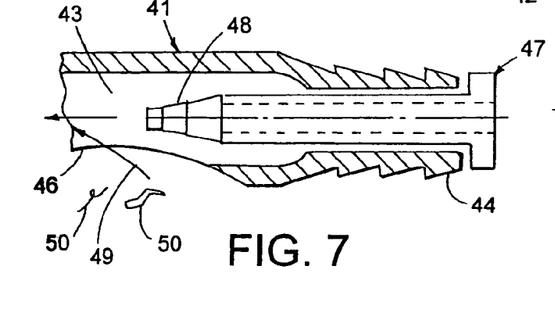
FIG. 7 is a fragmentary view of the orifice fitting of FIG. 5 positioned within the vacuum bar fitting of FIG. 6.

The illustrated trimming apparatus 10A includes a suction-creating device 40A which creates an air flow and suction under the tool holder 17A and draws chips and debris away from the trimming tool 14A as follows. A hole 40 is drilled tangentially through the end of the tool holder 17A at a location where the hole 40 partially penetrates into the area occupied by the cutter head 36. A vacuum barb fitting 41 (FIG. 5) includes a body 42 with an internal passageway 43 through the body 42. The body 42 includes an air-in end 44, an air-out end 45, and an open side 46 in a center area. The open side 46 is positioned so that it faces the cutters 37 on the trimming tool 14A. A vacuum orifice fitting 47 is extended into the passageway 43, and includes a reduced diameter tip 48 (FIGS. 6–7) that is located proximate the open side 46. When compressed air (see the illustrated shop air line 48', FIG. 3) is blown through the vacuum orifice fitting 47, a venturi effect occurs at the tip 48, which creates a vacuum that draws air 49 into the open side 46. The air 49 carries with it any chips and debris 50 that are cut loose from the liner 11 by the trimming tool 14A. The air 49 flows out the air-out end 45 and flows along a hose 51 (FIG. 3) into a collection device, such as the air-permeable collection bag 52. A shut-off valve 53 can be introduced into the compressed air line 48' to control airflow to the suction-creating device 40A.

The suction-creating device 40A is so effective, that a cylinder bore plug 55 may not be needed. Nonetheless, a plug 55 (FIGS. 10–11) is provided that includes a foam piece 56 that is equal to a diameter of the cylinder bore, and a flat piece of metal 57 is glued to a top surface of the foam piece 56. The plug 55 sits on the piston associated with the cylinder bore 12. This arrangement assures that all chips and debris will be collected, and that none will fall down into the cylinder bore. This arrangement can be particularly helpful where the combustion engine is torn apart, with the cylinder block 13 being left in the vehicle. It is believed to be particularly novel and inventive that the present tools 10 and 10A can be used on a cylinder block that remains in a vehicle engine compartment and that remains connected to vehicle transmission. Thus, the repair can be done without the expense and time required to totally remove the engine from the vehicle.

Figure 8:
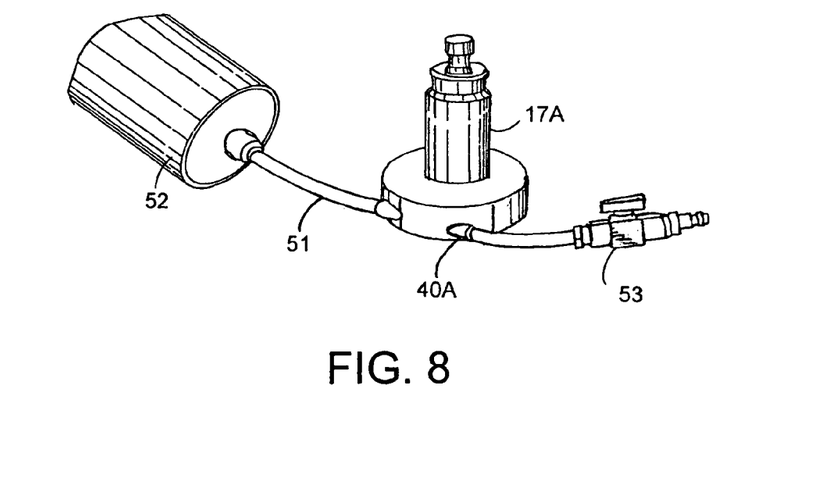
FIG. 8 is a perspective view similar to FIG. 3, but with the housing removed to better show the trimming tool.
Figure 9:
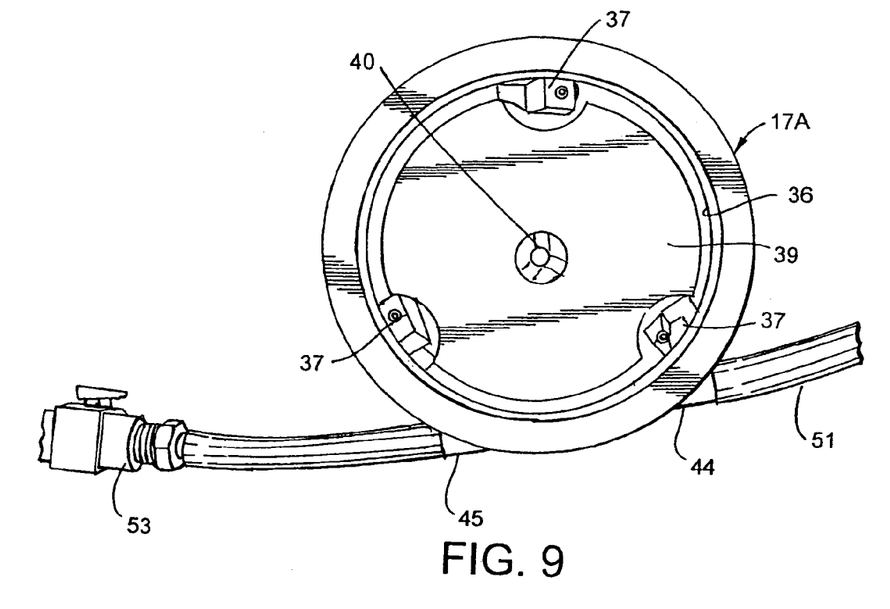
FIG. 9 is a bottom view of FIG. 3.
Figure 10:
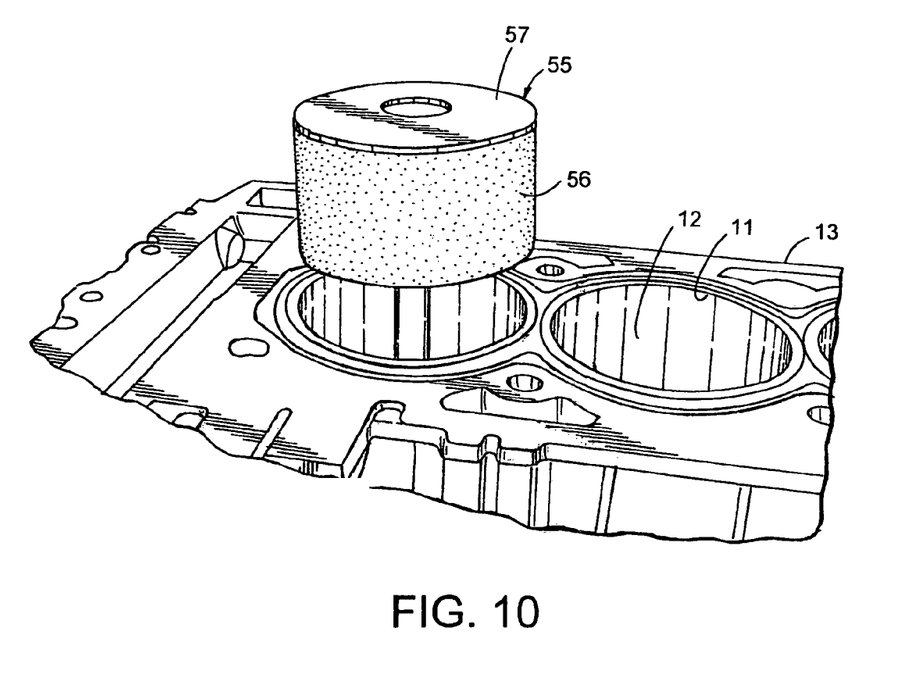
FIGS. 10 and 11 are perspective views of a cylinder block, FIG. 10 showing a plug before installation into a cylinder bore and FIG. 11 showing the plug after installation.
Figure 11:
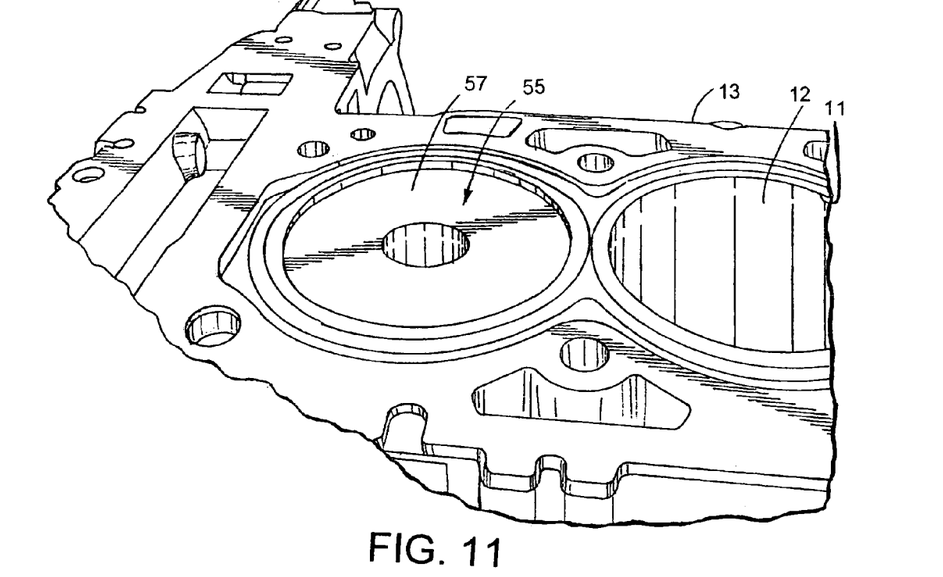
Figure 12:
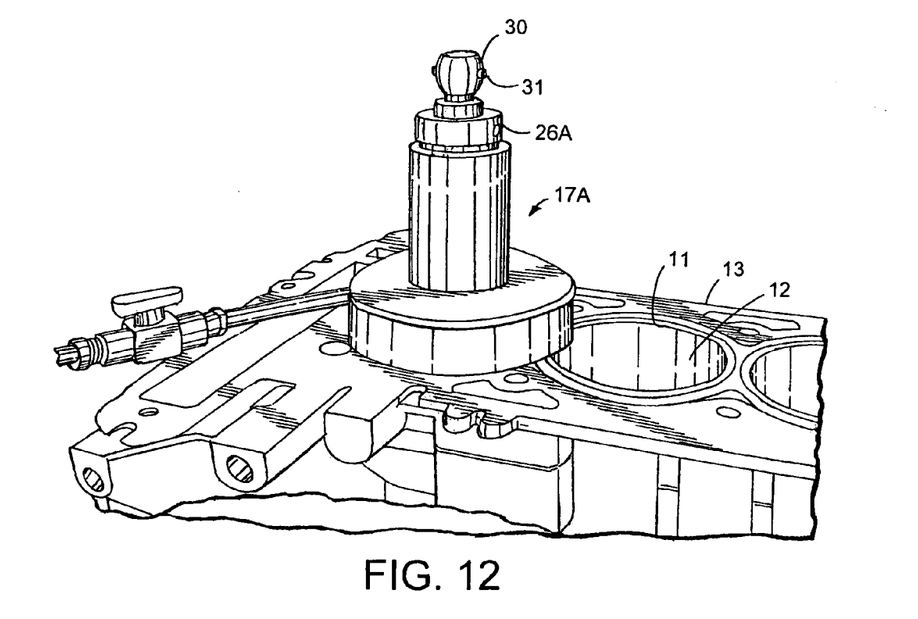
FIG. 12 is a perspective view of a cylinder block with the trimming tool positioned over one of the cylinder bores.
Figure 13:
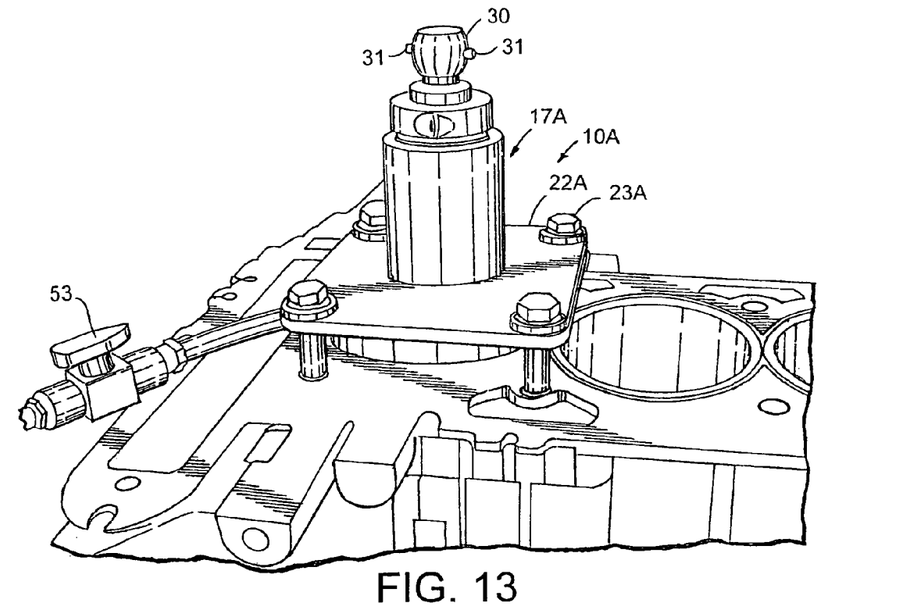
FIG. 13 is a perspective view similar to FIG. 12, but showing the tie-down device holding the trimming tool to the cylinder block.
Figure 14:
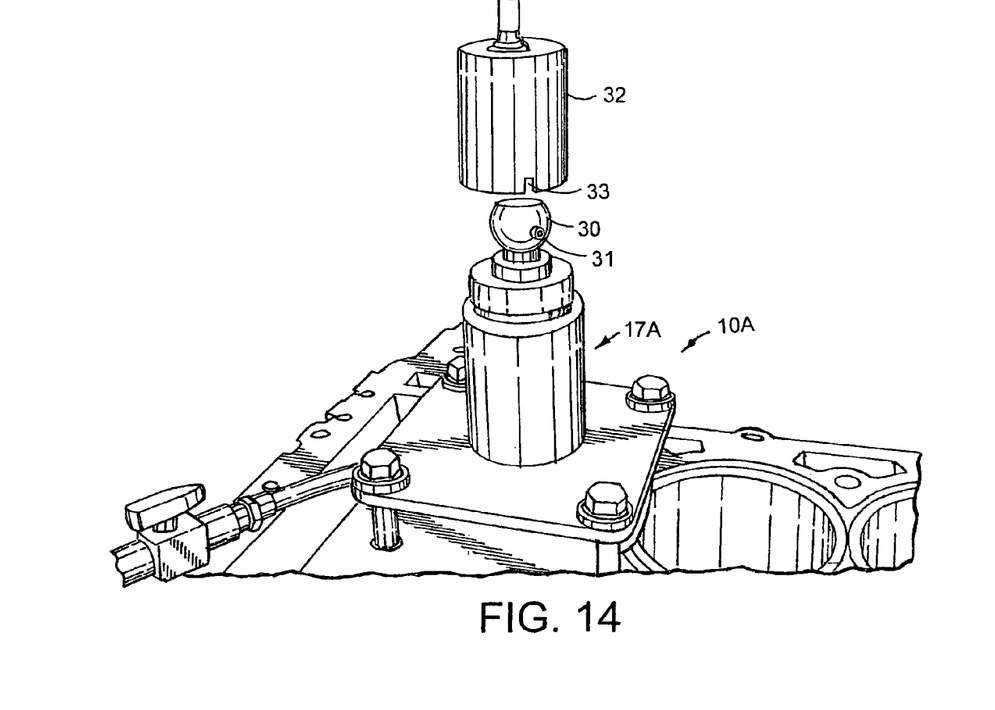
FIGS. 14 and 15 are perspective views showing a hand drill operatively engaging the trimming tool for trimming the protruding end of a bore liner.
Figure 15:
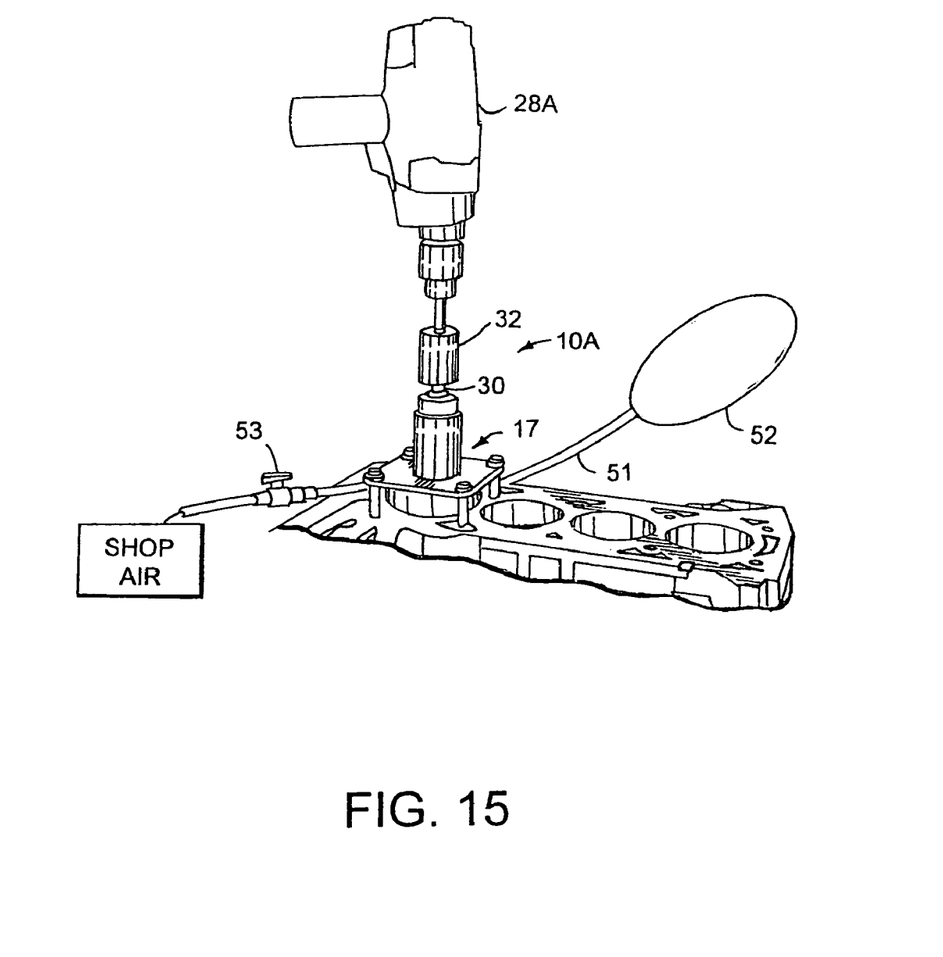

FIG. 8 shows the apparatus 10A, including the collection bag 52. FIG. 9 shows a bottom of the apparatus 10A, including the pilot 39 and small space around edges of the pilot 39 where the cutters 37 travel and where the suction from the suction-creating device has its primary effect. FIG. 10 shows a plug 55 being placed in a cylinder bore, and FIG. 11 shows the top of the plug 55 after installation. FIG. 12 shows the apparatus 10A placed on a selected cylinder bore, and FIG. 13 shows the apparatus 10A with tie-down device 21 bolted to a top of the cylinder block and holding the trimming apparatus 10A to the cylinder block. FIGS. 14 and 15 show operative engagement of a hand drill to the shank of the trimming apparatus 10A, for operating the trimming tool 14A to trim a protruding end of the liner 11 in the repaired cylinder bore.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A method for trimming a newly-installed sleeve liner after the liner is positioned in a cylinder bore of a combustion engine component, comprising steps of:

providing a trimmer including a trimming tool adapted to trim a protruding end of the newly-installed sleeve liner and including a tool holder operably supporting the trimming tool, the tool holder having a first section shaped and adapted to stably engage the combustion engine component and to receive the protruding end of the sleeve liner and also having a second section operably supporting the trimming tool for rotation and for axial movement toward a selected cylinder bore when the tool holder is attached to the combustion engine component;

setting a stop mechanism to limit the trimming tool to cutting only down to a flush condition on the engine component;

securing the tool holder to a face of the engine component;

operating the trimming tool to shave off the protruding end; and wherein the tool holder includes a tie-down device comprising a clamp plate engaging the first section, the clamp plate including first holes, and also includes bolts adapted for engaging mating threaded holes in the engine component, and wherein the step of securing the tool holder includes extending the bolts through the first holes and into threaded engagement with the threaded holes.

2. The method defined in claim 1, wherein the step of operating the trimming tool includes shaving the protruding end of the sleeve liner to a condition flush with a top surface of the engine component.

3. The method defined in claim 1, wherein the stop mechanism includes a thrust bearing on one of the trimming tool and the holder that engage to limit axial motion of the trimming tool, and including a step of engaging the thrust bearing to limit the axial motion of the trimming tool.

4. The method defined in claim 1, wherein the step of securing includes aligning an axis of rotation of the trimming tool with an axial centerline of the cylinder bore.

5. The method defined in claim 1, including a step of suctioning away debris during the step of operating the trimming tool.

6. The method defined in claim 1, wherein the trimming tool includes a cutting head and the holder defines a wall defining a pocket for receiving and housing the cutting head, and the method includes attaching a suctioning device to the wall and operating the suctioning device.

7. The method defined in claim 6, wherein the suctioning device includes an inlet passageway and an outlet passageway both configured to cause a suction when air is passed therethrough, and including a step of motivating air through the inlet and outlet passageways.

8. A method for trimming a newly-installed sleeve liner after the liner is positioned in a cylinder bore of a combustion engine component, comprising steps of:
providing a trimmer including a trimming tool adapted to trim a protruding end of the newly-installed sleeve liner and including a tool holder operably supporting the trimming tool, the tool holder having a first section shaped and adapted to stably engage the combustion engine component and to receive the protruding end of the sleeve liner and also having a second section operably supporting the trimming tool for rotation and for axial movement toward a selected cylinder bore when the tool holder is attached to the combustion engine component;
setting a stop mechanism to limit the trimming tool to cutting only down to a flush condition on the engine component;
securing the tool holder to a face of the engine component; and
operating the trimming tool to shave off the protruding end;
wherein the trimming tool includes a cutting head and the holder defines a wall defining a pocket for receiving and housing the cutting head, and the method includes attaching a suctioning device to the wall and operating the suctioning device;
wherein the suctioning device includes an inlet passageway and an outlet passageway both configured to cause a suction when air is passed therethrough, and including a step of motivating air through the inlet and outlet passageways; and
wherein the inlet and outlet passageways are aligned to form a continuous passageway that extends at a tangential angle to the pocket, with an intermediate portion of the continuous passageway opening into the pocket and with a shaped orifice in the continuous passageway to cause air flow resulting in a vacuum.

9. The method defined in claim 1, wherein the stop mechanism includes a stop on one of the trimming tool and the tool holder and is adjustable, and the other of the trimming tool and the tool holder has a mating surface that abuts the stop to limit longitudinal movement of the trimming tool relative to the tool holder, and including a step of adjusting the stop to cause a longitudinal movement of a cutter on the trimming tool to stop cutting when the protruding end of the sleeve liner is trimmed to a condition flush with a top of the material forming the selected bore cylinder.

10. A method of repairing a combustion engine component with a damaged cylinder bore, where a friction-fit sleeve liner of bearing material is positioned in the damaged cylinder bore to repair the cylinder bore, comprising steps of:
providing an apparatus including a trimming tool having a cutter adapted to shave off a protruding end of the newly-installed sleeve liner, the cutter being rotatable about a centerline that is adapted to be positioned collinearly with a centerline of the cylinder bore; the apparatus also including a tool holder for stably engaging the engine component and for operably supporting the trimming tool;
attaching the trimming tool to the combustion engine component, including holding the trimming tool for rotation over the selected cylinder bore with the centerline of the cutter aligned with the centerline of the cylinder bore;
rotating and extending the trimming tool to trim a protruding end of the liner;
providing a suction device on the tool holder and a collection bag on the suction device; operating the suctioning device to draw away debris during the stop of rotating and extending, including collecting the debris; and
providing a coupler atop the trimming tool and providing a drill attached to the coupler; wherein the step of rotating and extending the trimming tool includes operating the drill to rotate and axially extend the trimming tool, with the coupler compensating for misalignment of a centerline of rotation of the drill and the centerline of rotation of the trimming tool.

11. The method defined in claim 1, wherein the trimming tool has a drive shank adapted for attachment to a hand-held manually-operated drill, and wherein the step of operating the trimming tool includes rotating the trimming tool by using the drill.

12. The method defined in claim 11, wherein the second section of the tool holder has a bore neck, and the trimming tool includes a shaft that is rotatable and also axially shiftable in the bore neck, and wherein the trimming tool further includes a coupler that permits misalignment of the drill and the shaft while permitting forced rotation and translation of the trimming tool.

13. The method defined in claim 1, wherein the trimming tool includes a cutter rotatable about an axis of rotation, and the step of securing includes aligning the axis of rotation with a centerline of the cylinder bore so that when the cutter is rotated to trim an end of the liner, any score lines formed by the cutter on the trimmed end extend circumferentially and do not crisscross radially across the trimmed end.

14. A method for trimming a newly-installed sleeve liner after the liner is positioned in a cylinder bore of a combustion engine component, comprising steps of:
providing a trimmer including a trimming tool adapted to trim a protruding end of the newly-installed sleeve liner and including a tool holder operably supporting the trimming tool, the tool holder having a first section shaped and adapted to stably engage the combustion engine component and to receive the protruding end of the sleeve liner and also having a second section operably supporting the trimming tool for rotation and for axial movement toward a selected cylinder bore when the tool holder is attached to the combustion engine component;
setting a stop mechanism to limit the trimming tool to cutting only down to a flush condition on the engine component;

securing the tool holder to a face of the engine component;

operating the trimming tool to shave off the protruding end; and including a step of providing a cylinder bore plug shaped to fill a cross-sectional area of the selected cylinder bore to prevent loose material and debris from falling into the selected cylinder bore during the step of operating the trimming tool, and including a step of positioning the cylinder bore plug in the selected cylinder bore.

15. The method defined in claim 14, wherein the bore plug includes a foam piece that sits on a piston in the cylinder bore.

16. The method defined in claim 14, wherein the trimming tool includes a cutting head and the holder defines a wall defining a pocket for receiving and housing the cutting head, and the method includes attaching a suctioning device to the wall and operating the suctioning device.

17. The method defined in claim 10, wherein the coupler includes a universal coupler and a socket coupler that releasably engages the universal coupler.

18. The method defined in claim 10, wherein the centerline of rotation of the drill and the centerline of rotation of the trimming tool are in substantial alignment.

19. The method defined in claim 10, wherein the drill is a motorized hand drill.

20. A method of repairing a combustion engine component with a damaged cylinder bore, where a friction-fit sleeve liner of bearing material is positioned in the damaged cylinder bore to repair the cylinder bore, comprising steps of:

providing an apparatus including a trimming tool having a cutter adapted to shave off a protruding end of the newly-installed sleeve liner, the cutter being rotatable about a centerline that is adapted to be positioned collinearly with a centerline of the cylinder bore; the apparatus also including a tool holder for stably engaging the engine component and for operably supporting the trimming tool;

attaching the trimming tool to the combustion engine component, including holding the trimming tool for rotation over the selected cylinder bore with the centerline of the cutter aligned with the centerline of the cylinder bore; and providing a plug for filling a cross-sectional area of the cylinder bore, and inserting the plug into the bore to catch debris caused by the step of rotating and extending the trimming tool to trim the protruding end.

* * * * *